US010598139B2

(12) United States Patent
Pyle et al.

(10) Patent No.: US 10,598,139 B2
(45) Date of Patent: Mar. 24, 2020

(54) VARIABLE FLUID FLOW APPARATUS WITH INTEGRATED FILTER (71) Applicant: Woodward, Inc., Fort Collins, CO (US)

(72) Inventors: Deke Pyle, Zeeland, MI (US); Sander Niemeyer, Hudsonville, MI (US); Jason VanDort, West Olive, MI (US)

(73) Assignee: Woodward, Inc., Fort Collins, CO (US)

( * ) Notice: Subject to any disclaimer, the term of this patent is extended or adjusted under 35 U.S.C. 154(b) by 162 days.

(21) Appl. No.: 15/850,972

(22) Filed: Dec. 21, 2017

(65) Prior Publication Data

US 2018/0135576 A1 May 17, 2018

Related U.S. Application Data (62) Division of application No. 14/750,708, filed on Jun. 25, 2015, now Pat. No. 9,856,836.

(51) Int. Cl.
*F02M 37/22* (2019.01)
*F02C 7/22* (2006.01)
(Continued)

(52) U.S. Cl.
CPC ............. *F02M 37/22* (2013.01); *B01D 35/02* (2013.01); *F02C 7/222* (2013.01); *F02C 7/232* (2013.01);
(Continued)

(58) Field of Classification Search
CPC .......... B01D 35/02; F02C 7/222; F02C 7/232; F02C 9/28; F02M 37/22; F05D 2260/607; F17D 3/16; F23D 11/26; Y02T 50/675
See application file for complete search history.

(56) References Cited

U.S. PATENT DOCUMENTS 1,291,767 A  1/1919  Cogswell
2,088,614 A  8/1937  Schey
(Continued)

FOREIGN PATENT DOCUMENTS

CN  1673502  9/2005
CN  101930231  12/2010
(Continued)

OTHER PUBLICATIONS

International Search Report and Written Opinion of the International Searching Authority issued in International Application No. PCT/US2016/038550 dated Oct. 27, 2016; 10 pages.
(Continued)

*Primary Examiner* — Jesse S Bogue
(74) *Attorney, Agent, or Firm* — Fish & Richardson P.C.

(57) ABSTRACT

The subject matter of this specification can be embodied in, among other things, a fluid flow trim apparatus includes an outer housing defining a cavity having an interior surface and an end wall having an orifice therethrough, a valve body comprising a first valve portion disposed at least partly within the cavity, the first valve portion and the interior surface defining a first fluid flow path, a second valve portion in contact with the interior surface and defining a second fluid flow path. A third valve portion is disposed at least partly within the cavity between the first and second valve portions. The second fluid flow path fluidically connects the third valve portion to a trim cavity. A filter media extends from the first valve portion to the second valve portion and divides a third fluid flow path fluidically connecting the first and seconds fluid flow paths.

19 Claims, 5 Drawing Sheets (51) Int. Cl.
*F02C 7/232* (2006.01)
*F02C 9/28* (2006.01)
*F23D 11/26* (2006.01)
*B01D 35/02* (2006.01)
*F17D 3/16* (2006.01)
*F23R 3/28* (2006.01)
*F23R 3/46* (2006.01)

(52) U.S. Cl.
CPC ............... *F02C 9/28* (2013.01); *F17D 3/16* (2013.01); *F23D 11/26* (2013.01); *F05D 2260/607* (2013.01); *F23K 2301/202* (2013.01); *F23R 3/286* (2013.01); *F23R 3/46* (2013.01); *Y02T 50/675* (2013.01)

(56) References Cited

U.S. PATENT DOCUMENTS

| | | | | |
|---|---|---|---|---|
| 2,921,742 | A * | 1/1960 | Johnsyn, Jr. | F23D 11/28 239/125 |
| 2,954,172 | A * | 9/1960 | Grundman | F23D 11/24 239/443 |
| 3,693,889 | A | 9/1972 | Schuster | |
| 3,782,640 | A * | 1/1974 | Kirschmann | B05B 1/14 239/571 |
| 4,638,636 | A | 1/1987 | Cohen | |
| 4,798,330 | A * | 1/1989 | Mancini | F23D 11/10 239/125 |
| 5,356,079 | A * | 10/1994 | Rahbar | F02M 61/16 239/585.1 |
| 5,641,126 | A | 6/1997 | Nally | |
| 5,707,012 | A | 1/1998 | Maier et al. | |
| 5,799,871 | A * | 9/1998 | Theurer | F23D 11/26 137/510 |
| 6,135,094 | A * | 10/2000 | Okada | F02M 37/22 123/470 |
| 6,461,506 | B1 * | 10/2002 | Bradford | B01D 29/114 210/309 |
| 6,648,247 | B2 | 11/2003 | McFarland | |
| 7,526,911 | B2 | 5/2009 | Pickard et al. | |
| 7,921,915 | B2 | 4/2011 | Richard et al. | |
| 8,393,156 | B2 | 3/2013 | Niemeyer et al. | |
| 8,501,012 | B2 * | 8/2013 | Himmel | B01D 35/02 210/741 |
| 8,776,529 | B2 | 7/2014 | Paradise | |
| 9,550,136 | B2 * | 1/2017 | Carpenter | B01D 35/147 |
| 2004/0069704 | A1 * | 4/2004 | Yamaguchi | B01D 29/35 210/497.01 |
| 2004/0217203 | A1 * | 11/2004 | Walti | B05B 1/3426 239/492 |
| 2007/0204835 | A1 | 9/2007 | Xi et al. | |
| 2009/0320483 | A1 | 12/2009 | Storey et al. | |
| 2016/0108878 | A1 | 4/2016 | Falaschi | |

FOREIGN PATENT DOCUMENTS

| | | |
|---|---|---|
| CN | 203717131 | 7/2014 |
| CN | 203894056 | 10/2014 |
| CN | 104316309 | 1/2015 |
| GB | 733529 A | 7/1955 |
| JP | H0315630 A | 1/1991 |
| WO | WO2012075483 A2 | 6/2012 |

OTHER PUBLICATIONS

International Preliminary Report on Patentability issued in International Application No. PCT/US2016/038550 dated Dec. 26, 2017, 7 pages.

Chinese Office Action in Chinese Application No. 201680049888.5 dated Aug. 2, 2019, with English Translation 16 pages.

* cited by examiner

VARIABLE FLUID FLOW APPARATUS WITH INTEGRATED FILTER

CROSS-REFERENCE TO RELATED APPLICATIONS

This application is a divisional application of and claims the benefit of priority to U.S. application Ser. No. 14/750,708, filed on Jun. 25, 2015, the contents of which are hereby incorporated by reference.

TECHNICAL FIELD

This instant specification relates to turbine engine fuel nozzle components.

BACKGROUND

The gas turbine engine is the preferred class of internal combustion engine for many high power applications. Fundamentally, the gas turbine engine features an upstream rotating compressor coupled to a downstream turbine, and a combustion chamber in-between. The combustion chamber can include multiple mixers to mix fuel and air prior to combustion. Typically, each mixer requires an individual fuel injector tip (nozzle) to spray the fuel into the mixer's airflow.

In some operating conditions on a turbine engine, multiple fuel injectors are tuned to flow equal amounts of fuel. Reducing injector-to-injector variation enables better control of local fuel-to-air ratios in the combustor and allows for uniform temperature distribution at the inlet to the turbine stage. Uniform fuel flow from injector-to-injector is accomplished by calibrating the nozzle's flow number (FN) at a key operating condition. The pressure drop of the nozzle is adjusted to be in a narrow range at a known flow. In some applications, the calibration point tends to be at a high flow, where the accuracy of flow from injector to injector is most critical.

Nozzle calibration can be accomplished by adjusting the pressure drop of a flow restriction in the nozzle, which is typically in series with the tip restriction of the nozzle. This adjustable flow restriction in the nozzle is referred to as the calibration orifice. Nozzle flow typically passes through the calibration orifice and then the tip, which combine to give the nozzle its high-flow pressure drop characteristic.

SUMMARY

In general, this document describes turbine engine fuel nozzle components.

In a first aspect, a fluid flow trim apparatus includes an outer housing having an elongate body extending from a first end to a second end opposite the first end and defining a cavity having an interior surface with a first cross-sectional area and an end wall at the second end, the end wall having an orifice therethrough with a second cross-sectional area less than the first cross-sectional area, a valve body having an elongate body and comprising a first valve portion disposed at least partly within the cavity and having a third cross-sectional area smaller than the first cross-sectional area, the first valve portion and the interior surface defining a first fluid flow path, a second valve portion in contact with the interior surface and having a channel formed therethrough defining a second fluid flow path, the second valve portion, the interior surface, and the end wall defining a trim cavity, and a third valve portion disposed at least partly within the cavity between the first valve portion and the second valve portion and having a fourth cross-sectional area smaller than the second cross-sectional area, the second fluid flow path fluidically connecting the third valve portion to the trim cavity. The apparatus also includes a filter media extending from the first valve portion to the second valve portion and dividing a third fluid flow path fluidically connecting the first fluid flow path to the second fluid flow path.

Various embodiments can include some, all, or none of the following features. The valve body can be adjustably positionable within the cavity to a selected position to modify a fifth cross-sectional area of a fourth fluid flow path fluidly connecting the channel to the orifice through the trim cavity when a fluid is not flowing through the fluid flow trim apparatus, and the valve body is not adjustably positionable within the second cavity portion when the fluid is flowing through the fluid flow trim apparatus. The valve body can be adjustably positionable such that the fifth cross-sectional area has a flowable area equal to or less than a flowable area of the orifice. The valve body can be adjustably positionable to block the fourth fluid flow path. The valve body can be held in the selected position by frictional contact of the valve body with the interior surface. The valve body can be held in the selected position by a collection of threads formed on an outer surface of the valve body in mating contact a collection of threads formed on the interior surface. The filter media can provide a flowable area substantially greater than a flowable area of the channel. The third fluid flow path can be substantially not parallel to the first fluid flow path. The cavity can further include a first interior surface portion extending from the first end and partly into the cavity, and a second interior surface portion extending from the first cavity portion to the second end, the second interior surface portion having a sixth cross-sectional area less than the first cross-sectional area, and wherein the second valve portion is in contact with the second interior surface portion.

In a second aspect, a method of trimming a fluid flow includes providing a fluid flow trim apparatus having an elongate body extending from a first end to a second end opposite the first end and defining a cavity having an interior surface with a first cross-sectional area and an end wall at the second end, and a valve body disposed at least partly within the cavity and having a first valve portion having a second cross-sectional area less than the first cross-sectional area, a second valve portion having a third cross-sectional area less than the second cross-sectional area, and a third valve portion in sealing contact with the interior wall, providing a fluid at the first end, flowing the fluid along a first fluid path through a first cavity portion defined by the interior wall and the first valve portion and extending from the first end partly into the elongate body, flowing the fluid along a second fluid path across a filter media in a second cavity portion defined by the interior wall and the second valve portion and extending from the first valve portion to the third valve portion, flowing the fluid along a third fluid flow path in a channel in a third valve portion to a trim cavity defined by the third valve portion, the interior surface, and the end wall, and flowing the fluid through the trim cavity along a fourth fluid path to an orifice in the end wall, the orifice having a fourth cross-sectional area less than the first cross-sectional area.

Various implementations can include some, all, or none of the following features. The method can further include adjustably positioning, while the fluid is not flowing, the valve body to a selected position within the cavity to modify a flowable area of the fourth fluid flow path, the valve member maintaining the selected position while the fluid is flowing through the fluid flow trim apparatus. The valve body van be adjustably positionable such that the flowable area of the fourth fluid flow path is equal to or less than a flowable area of the orifice. The valve body can be adjustably positionable to block the fourth fluid flow path. The valve body can be held in the selected position by frictional contact of the valve body with the interior surface. Adjustably positioning the valve body to a selected position can further include threadedly mating a collection of threads formed on an outer surface of the valve body with a collection of threads formed on the interior surface. The filter media can provide a flowable area substantially greater than a flowable area of the channel. The second fluid flow path can be substantially not parallel to the first fluid flow path. The cavity can further include a first interior surface portion extending from the first end and partly into the cavity, and a second interior surface portion extending from the first cavity portion to the second end, the second interior surface portion having a sixth cross-sectional area less than the first cross-sectional area, and wherein the second valve portion is in contact with the second interior surface portion.

In a third aspect, a fluid flow trim apparatus includes an outer housing having an elongate body extending from a first end to a second end opposite the first end and defining a cavity having an interior surface with a first cross-sectional area and an end wall at the second end, the end wall having an orifice therethrough with a second cross-sectional area less than the first cross-sectional area, a valve body having an elongate body and comprising a first valve portion disposed at least partly within the cavity and having a third cross-sectional area smaller than the first cross-sectional area, the first valve portion being in contact with the interior surface and having a channel formed therethrough defining a first fluid flow path, a second valve portion having a fourth cross-sectional area smaller than the first cross-sectional area, the second valve portion and the interior surface defining a second fluid flow path, and a third valve portion disposed at least partly within the cavity between the first valve portion and the second valve portion and having a fourth cross-sectional area less than the third cross-sectional area, the second fluid flow path fluidically connecting the third valve portion to the trim cavity, and a filter media extending from the first valve portion to the second valve portion and dividing a third fluid flow path fluidically connecting the first fluid flow path to the second fluid flow path.

In a fourth aspect, an internal combustion engine includes an engine housing having a combustion chamber formed therein, a fuel supply line, and a fluid flow trim apparatus fluidically connecting the fuel supply line to the cylinder. The fluid flow trim apparatus includes an outer housing having an elongate body extending from a first end to a second end opposite the first end and defining a cavity having an interior surface with a first cross-sectional area and an end wall at the second end, the end wall having an orifice therethrough with a second cross-sectional area less than the first cross-sectional area, a valve body having an elongate body and having a first valve portion disposed at least partly within the cavity and having a third cross-sectional area smaller than the first cross-sectional area, the first valve portion and the interior surface defining a first fluid flow path, a second valve portion in contact with the interior surface and having a channel formed therethrough defining a second fluid flow path, the second valve portion, the interior surface, the end wall defining a trim cavity, and a third valve portion disposed at least partly within the cavity between the first valve portion and the second valve portion and having a fourth cross-sectional area smaller than the second cross-sectional area, the second fluid flow path fluidically connecting the third valve portion to the trim cavity, and a filter media extending from the first valve portion to the second valve portion and dividing a third fluid flow path fluidically connecting the first fluid flow path to the second fluid flow path.

The systems and techniques described here may provide one or more of the following advantages. First, a fluid trim apparatus can provide a flow that is adjustable for a desired flow characteristic to compensate for variable manufacturing tolerances. Second, the fluid trim apparatus can maintain its adjusted flow characteristic when in operation. Third, the fluid trim apparatus can provide an integrated filter that can prevent contaminates from interfering with fluid flow. Fourth, the integrated filter is configured such that the fluid trim apparatus can withstand a buildup of filtered contaminates substantially without interfering with the adjusted flow characteristic when in operation.

The details of one or more implementations are set forth in the accompanying drawings and the description below. Other features and advantages will be apparent from the description and drawings, and from the claims.

DETAILED DESCRIPTION

This document describes systems and techniques for using a variable trim orifice with an integral filter. In general, fuel injector systems can be tuned for a desired fluid flow rate and/or pattern. The rate of flow through a fuel injector can vary due to a number of causes, such as manufacturing tolerances and debris buildup in the injector. Debris buildup can be reduced through the use of a filter, and manufacturing tolerances can be compensated for by adjusting a variable trim orifice. This document describes examples of systems and techniques for using a variable trim orifice with integral filter to address both of these causes.

Figure 1:
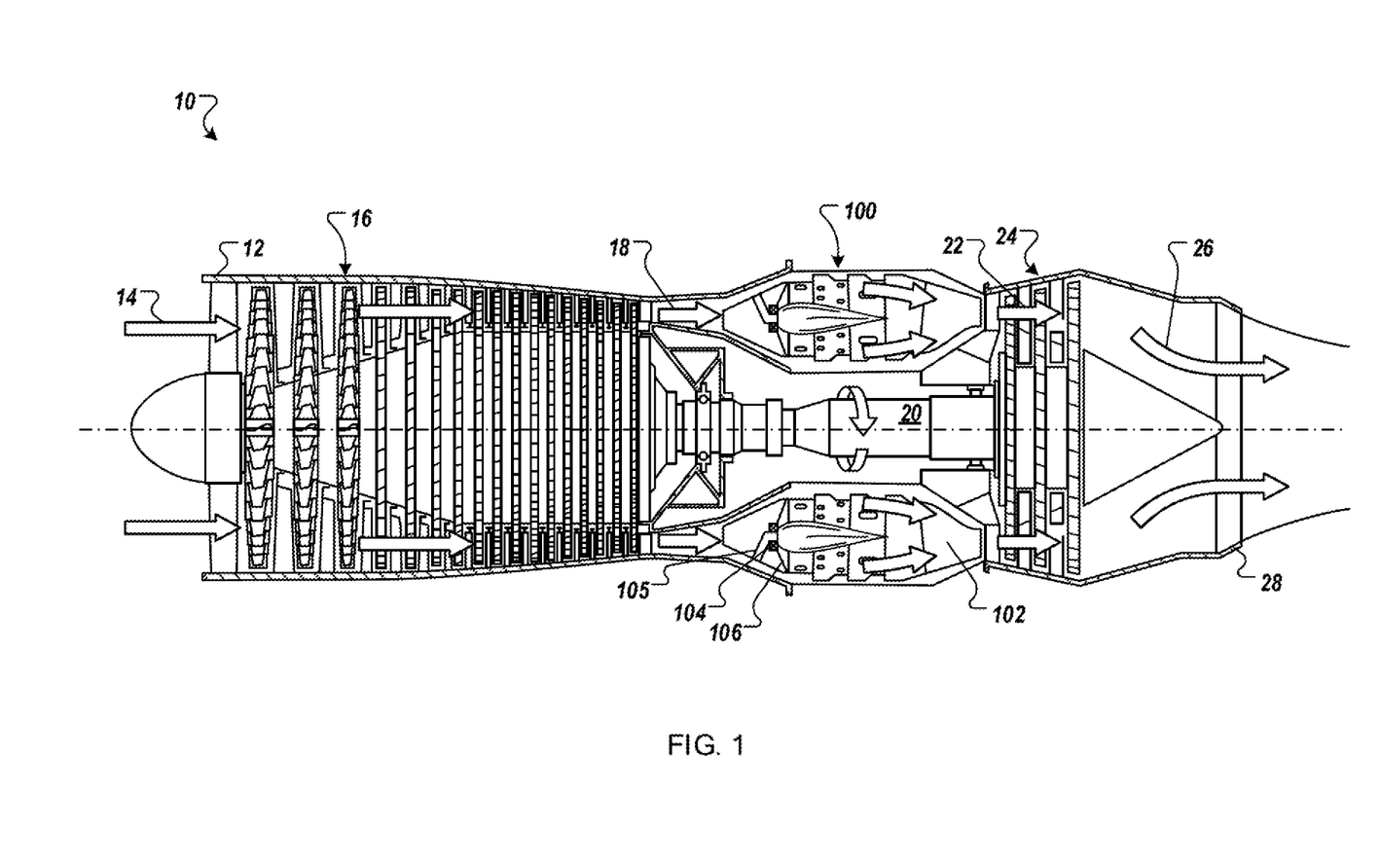
FIG. 1 is a half, side cross-sectional view of an example of a turbine engine.

FIG. 1 is a half, side cross-sectional view of an example of a turbine engine 10. The turbine engine 10 is a turbojet-type gas turbine that could be used, for example, to power jet aircraft. However, the concepts described in the present disclosure are not so limited, and can be incorporated in the design of various other types of turbine and/or internal combustion engines (e.g., turbofan, turboprop, turboshaft, industrial/marine engines or others).

As shown, the example turbine engine 10 generally facilitates a continuous axial flow of gas. That is, gas generally flows through the engine 10 in the axially downstream direction indicated by the arrows in FIG. 1. The turbine engine 10 includes an intake 12 that receives ambient air 14 and directs the ambient air 14 to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple fuel injectors 104, and a combustor dome 106. At the combustor 100, the high-pressure air 18 is mixed with liquid hydrocarbon fuel (not shown) provided through a fuel supply line 105, and ignited to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power.

Figure 2:
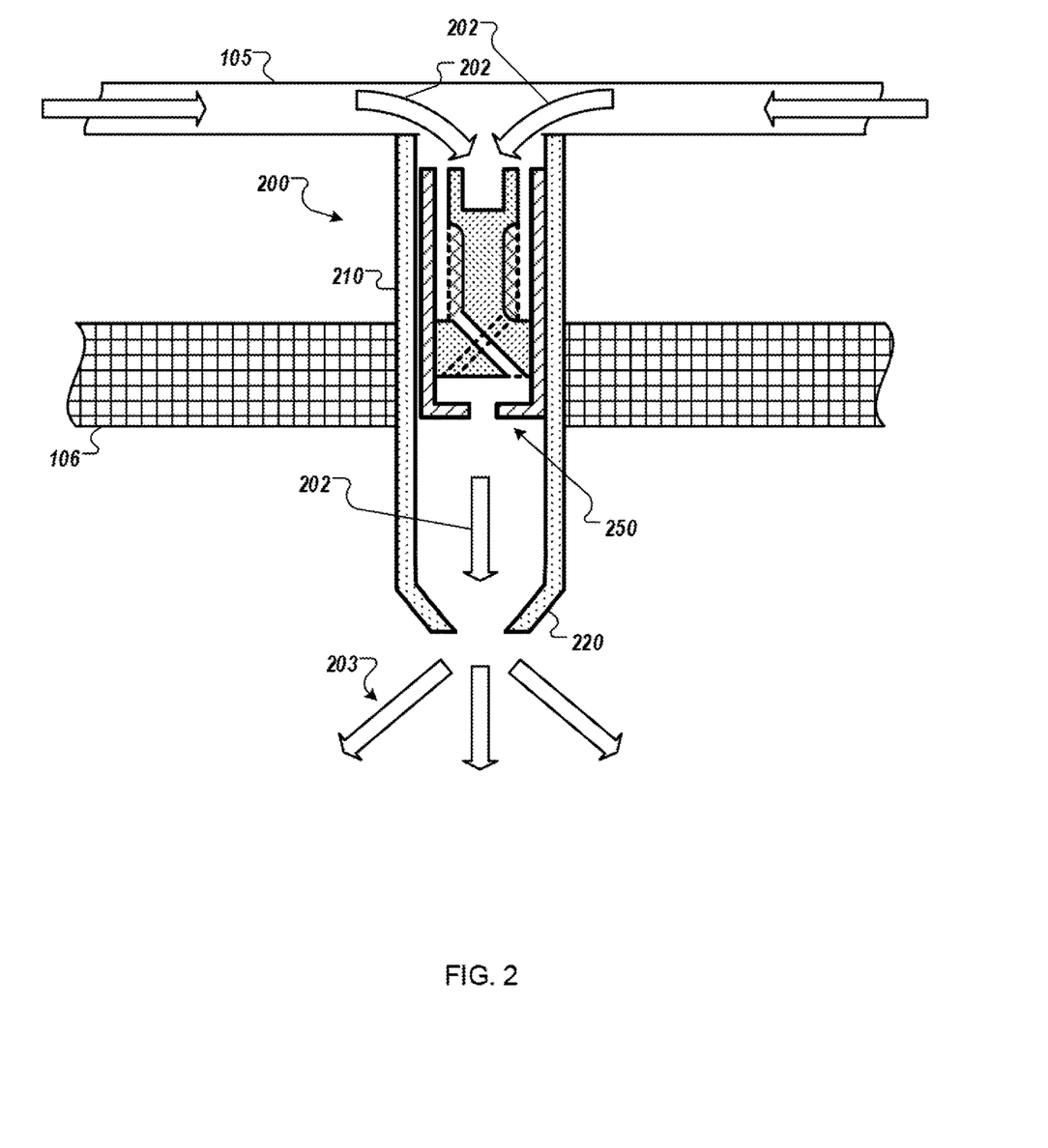
FIG. 2 is a cross-sectional view of an example of a fuel injector.

FIG. 2 is a cross-sectional view of an example of a fuel injector 200. In some embodiments, the fuel injector 200 can be the fuel injector 104 of the example combustor 100 of FIG. 1. In general, the fuel injector 200 is configured to receive liquid hydrocarbon fuel (not shown) provided through a fuel supply line 105, and provide a fluid conduit through the combustion dome 106.

The fuel injector 200 includes an injector housing 210 and a nozzle 220. The injector housing 210 is configured to provide a fluid conduit through a wall in the combustion dome 106. The nozzle 220 is configured to convert a flow of fuel 202 through the injector housing 210 into a spray or stream 203. The volume of fuel that passes through the nozzle 220 and/or the pattern of the spray or stream 203 is affected by the flow of fuel 202.

A variable trim orifice 250 is included within the injector housing 210. In general, the variable trim orifice 250 is configured to be adjustable to alter the rate at which the flow of fuel 202 passes to the injector nozzle 220, as well as filter out particulate materials that are suspended in the fuel.

Figure 3:
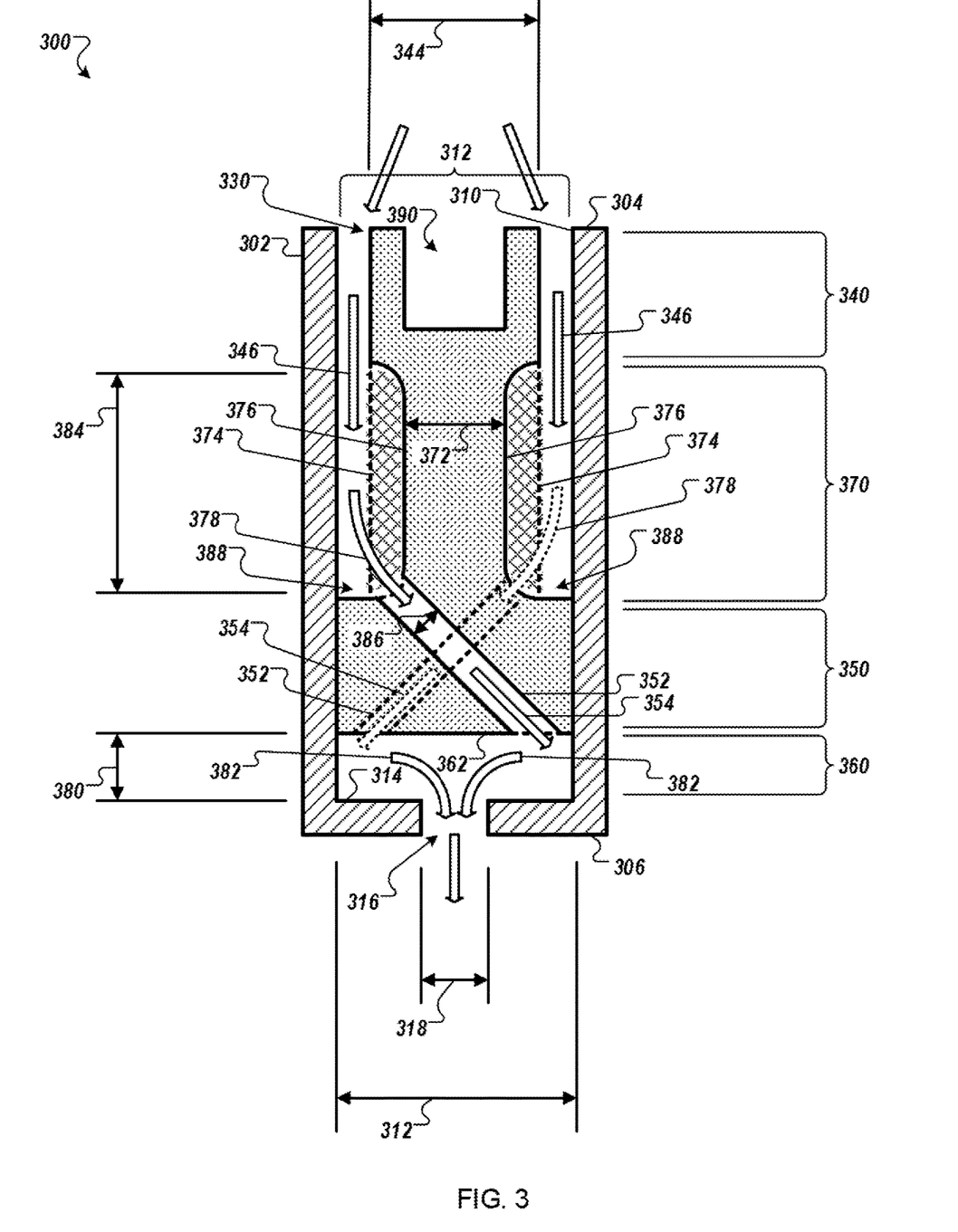
FIG. 3 is a cross-sectional view of an example of a fluid flow trim apparatus.

FIG. 3 is a cross-sectional view of an example of a fluid flow trim apparatus 300. In some embodiments, the fluid flow trim apparatus 300 can be a variable trim orifice with a filter. In some embodiments, the fluid flow trim apparatus 300 can be the variable trim orifice 250 of FIG. 2.

The example fluid flow trim apparatus 300 includes an outer housing 302. The outer housing 302 is configured as an elongate body extending from a first end 304 to a second end 306 opposite the first end 304. The outer housing 302 defines a cavity 308 comprising an interior surface 310 with a cross-sectional area 312 and an end wall 314 at the second end 306. The end wall 314 includes an orifice 316 with a cross-sectional area 318 less than the cross-sectional area 312.

The example fluid flow trim apparatus 300 also includes a valve body 330 configured as an elongate body. A valve portion 340 of the valve body 330 is disposed at least partly within the cavity 312 and has a cross-sectional area 344 smaller than the cross-sectional area 312. The space between the valve portion 342 and the interior surface 310 defines a fluid flow path 346.

A valve portion 350 of the valve body 330 is configured to contact the interior surface 310 and includes a collection of channels 352 formed therethrough. The channels 352 provide a collection of fluid flow paths 354. A trim cavity 360 is defined by an end wall 362 of the valve portion 350, the interior surface 310, and the end wall 314.

A valve portion 370 of the valve body 330 is disposed at least partly within the cavity 312 between the valve portion 340 and the valve portion 350. The valve portion 370 has a cross-sectional area 372 that is smaller than the cross-sectional area 344. The fluid flow path 352 fluidically connects the valve portion 370 and the fluid flow path 356 to the trim cavity 360 and the orifice 316.

In some embodiments, the cavity 312 can include a first interior surface portion extending from the first end 304 and partly into the cavity 312, and a second interior surface portion extending from approximately the first cavity portion to approximately the second end 306, and the second interior surface portion can have a cross-sectional area less than the cross-sectional area 344, and the valve portion 350 can be in contact with the second interior surface portion.

In the exemplary embodiment, a filter media 374 extends substantially (e.g., at least half of the distance) from the valve portion 340 to the valve portion 350 along an outer surface 376 of the valve portion 370. The filter media 374 divides a fluid flow path 378 that fluidly connects the fluid flow path 346 to the fluid flow path 354. The filter media 374 provides a flowable area 384 substantially greater than a flowable area 386 of the channel 352. In some embodiments, the flowable area 384 can be at least about two times larger than the flowable area 386 of the channel 352. The filter media 374 and the fluid flow path 378 are substantially not parallel to the fluid flow path 346, e.g., the filter media 374 is more than 30 degrees away from being parallel to the fluid flow path 346.

In some embodiments, by configuring the flowable area 384 to be substantially greater than the flowable area 386 and nonparallel to the fluid flow path 346, contaminants filtered out by the filter media 374 can accumulate within the space between the valve portion 342 and the interior surface 310 that defines the fluid flow path 346. For example, such filtered contaminants can accumulate, starting at a downstream end 388 of the fluid flow path 346 and grow upstream. As the contaminants build up, the rate of fluid flow along the fluid flow paths 346, 378, 352, and 382 can remain substantially unimpeded by the contaminants until the buildup effectively reduces the flowable area 386 to a cross section approximately equal to or less than one or more of the flowable area 386, the cross sectional area 318, or the flowable area 380.

The valve body 330 includes a coupler portion 390 near the first end 304. The coupler portion 390 provides features that can couple the valve body 330 to an external tool (e.g., a puller). In some examples, a tool can be coupled to the valve body 330 at the coupler portion 390, and the tool can be used to apply linear or rotational forces to the valve body 330 (e.g., relative to the outer housing 302). In some embodiments, the coupler portion 390 can include threads that can be threadably coupled to mating threads on an external tool to removably couple the valve body 330 to the threaded tool. In some embodiments, other arrangements of threads, ridges, cams, or other appropriate coupler features may be formed at the coupler portion 390.

The valve body 330 is adjustably positionable within the cavity 312. The valve portion 350 is configured to contact the interior surface 310 and slide or be threaded within the cavity to a selected position to modify a flowable area 380 of a fluid flow path 382 fluidly connecting the channel to the orifice 316 through the trim cavity 360 when a fluid is not flowing through the fluid flow trim apparatus 300, and the valve body 330 is not adjustably positionable within the cavity 312 when the fluid is flowing through the fluid flow trim apparatus 300. For example, the valve body 330 can be adjusted within the cavity 312 to calibrate one or more fluid flow parameters, e.g., to compensate for manufacturing variability in the dimensions of nozzle 220 of FIG. 2. Once calibrated, the fluid flow trim apparatus 300 can be inserted into a fuel injector (e.g., the fuel injector 200) to modify the flow of fuel through the injector based on the calibrated flow parameter(s). In general, when the fluid flow trim apparatus 300 is assembled into a fuel injector and/or an engine application, the fluid flow trim apparatus 300 is not accessible for re-calibration and the valve member 330 will not move within the cavity 312 to alter the flowable area 380 and/or the calibrated flow parameters(s).

In some embodiments, the valve body 330 can be adjustably positionable such that the flowable area 380 has a flowable area equal to or less than a flowable area of the orifice 316. For example, the flowable area 380 can be adjusted to have a flowable area that is equal to or less than the cross sectional area 318. In some embodiments, the valve body 330 can be adjustably positionable to block the fluid flow path 382. For example, the valve body 330 may be adjusted to bring the end wall 362 into contact with the end wall 314, in which case the flowable area 380 will be essentially zero.

In some embodiments, the valve body 330 can be held in a selected position within the cavity 312 by frictional contact of the valve body 330 with the interior surface 310. For example, contact between the valve portion 350 and the interior surface 310 can provide enough friction to prevent the valve body 330 from moving (e.g., due to fluid pressure or movement, vibration, acceleration forces) other than when the fluid flow trim assembly 300 is being calibrated In some embodiments, the valve body 330 can be held in a selected position within the cavity 312 by a collection of threads formed on an outer surface of the valve body 330 in mating contact with a collection of threads formed on the interior surface 310. For example, interior surface 310 may include threads formed in the valve outer housing 302, and the outer periphery of the valve portion 350 may include threads that can correspondingly mate with the threads on the interior surface 310. In such an example, the valve body 330 may be moved to adjust the flowable area 380 by threading and unthreading the valve body 330 within and relative to the outer housing 302 to adjust the flowable area 380. In some embodiments, the valve body 330 may be held in a selected position within the cavity 312 by a press fit, a tack weld, a retaining clip, a locking coil, an adhesive, an epoxy, or any other appropriate technique that can be used to maintain the position of the valve body 330 within the cavity 312.

Figure 4:
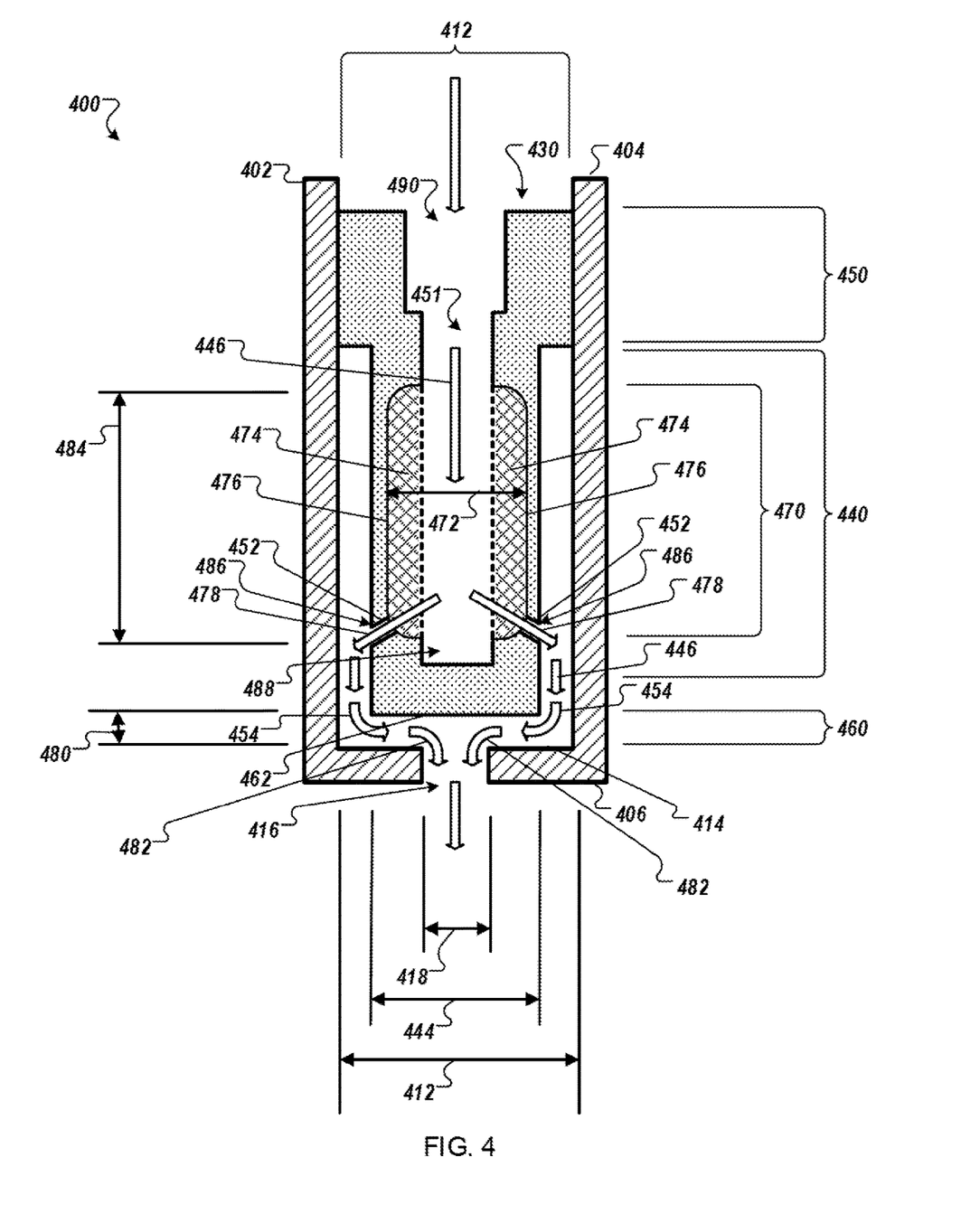
FIG. 4 is a cross-sectional view of an example of another fluid flow trim apparatus.

FIG. 4 is a cross-sectional view of an example of another fluid flow trim apparatus 400. In some embodiments, the fluid flow trim apparatus 400 can be a variable trim orifice with a filter. In some embodiments, the fluid flow trim apparatus 400 can be the variable trim orifice 250 of FIG. 2.

The variable fluid flow trim orifice 400 includes an outer housing 402. The outer housing 402 is configured as an elongate body extending from a first end 404 to a second end 406 opposite the first end 404. The outer housing 402 defines a cavity 408 comprising an interior surface 410 with a cross-sectional area 412 and an end wall 414 at the second end 406. The end wall 414 includes an orifice 416 with a cross-sectional area 418 less than the cross-sectional area 412.

The variable fluid flow trim orifice 400 also includes a valve body 430 configured as an elongate body. A valve portion 440 of the valve body 430 is disposed at least partly within the cavity 412 and has a cross-sectional area 444 smaller than the cross-sectional area 412. The space between the valve portion 442 and the interior surface 410 defines a fluid flow path 446. A trim cavity 460 is defined by an end wall 462 of the valve portion 440, the interior surface 410, and the end wall 414.

A valve portion 450 of the valve body 430 is configured to contact the interior surface 410 and includes a channel 451 formed therethrough. The channel 451 defines a fluid flow path 446.

A valve portion 370 of the valve body 330 is disposed at least partly within valve portion 440. The valve portion 470 has a cross-sectional area 472 that is less than the cross-sectional area 444 and greater than the cross-sectional area of the channel 451. A collection of fluid flow paths 452 fluidically connect the valve portion 470 and the fluid flow path 446 to the trim cavity 460 and the orifice 416.

In some embodiments, the cavity 412 can include a first interior surface portion extending from the first end 404 and partly into the cavity 412, and a second interior surface portion extending from approximately the first cavity portion to approximately the second end 406, and the first interior surface portion can have a cross-sectional area less than the cross-sectional area 4124, and the valve portion 450 can be in contact with the first interior surface portion.

In the exemplary embodiment, a filter media 474 extends substantially (e.g., at least halfway) from the valve portion along the valve portion 470 along an inner surface 476 of the valve portion 470. In some embodiments, the filter media 474 can extend along an outer surface of the valve portion 470. The filter media 474 divides a fluid flow path 478 that fluidly connects the fluid flow path 446 to the fluid flow path 454. The filter media 474 provides a flowable area 484 substantially greater than a flowable area of the channel 452 (e.g., at least 2× greater). The filter media 474 and the fluid flow path 478 are substantially not parallel to the fluid flow path 446.

In some embodiments, by configuring the flowable area 484 to be substantially greater than the flowable area 486 and nonparallel to the fluid flow path 446, contaminants filtered out by the filter media 474 can accumulate within the channel 451 that defines the fluid flow path 446. For example, such filtered contaminants can accumulate, starting at a downstream end 488 of the fluid flow path 446 and grow upstream. As the contaminants build up, the rate of fluid flow along the fluid flow paths 446, 478, 452, and 482 can remain substantially unimpeded by the contaminants until the buildup effectively reduces the flowable area 486 to a cross section approximately equal to or less than one or more of the flowable area 486, the cross sectional area 418, or the flowable area 480.

The valve body 430 includes a coupler portion 490 near the first end 404. The coupler portion 490 provides features that can couple the valve body 430 to an external tool (e.g., a puller). In some examples, a tool can be coupled to the valve body 430 at the coupler portion 490, and the tool can be used to apply linear or rotational forces to the valve body 430 (e.g., relative to the outer housing 402). In some embodiments, the coupler portion 490 can include threads that can be threadably coupled to mating threads on an external tool to removably couple the valve body 430 to the threaded tool. In some embodiments, other arrangements of threads, ridges, cams, or other appropriate coupler features may be formed at the coupler portion 490

The valve body 430 is adjustably positionable within the cavity 412. The valve portion 450 is configured to contact the interior surface 410 and slide or be threaded within the cavity to a selected position to modify a flowable area 480 of a fluid flow path 482 fluidly connecting the channel to the orifice 416 through the trim cavity 460 when a fluid is not flowing through the fluid flow trim apparatus 400, and the valve body 430 is not adjustably positionable within the cavity 412 when the fluid flow trim apparatus 400 is installed in its operational environment (e.g., the turbine engine 10 of FIG. 1) and the fluid is flowing through the fluid flow trim apparatus 400. For example, the valve body 430 can be adjusted within the cavity 412 to calibrate one or more fluid flow parameters, e.g., to compensate for manufacturing variability in the dimensions of nozzle 220 of FIG. 2. Once calibrated, the fluid flow trim apparatus 400 can be inserted into a fuel injector (e.g., the fuel injector 200) to modify the flow of fuel through the injector based on the calibrated flow parameter(s). In general, when the fluid flow trim apparatus 400 is assembled into a fuel injector and/or an engine application, the fluid flow trim apparatus 400 is not accessible for re-calibration and the valve member 430 will not move within the cavity 412 to alter the flowable area 480 and/or the calibrated flow parameters(s).

In some embodiments, the valve body 430 can be adjustably positionable such that the flowable area 480 has a flowable area equal to or less than a flowable area of the orifice 416. For example, the flowable area 480 can be adjusted to have a flowable area that is equal to or less than the cross sectional area 418. In some embodiments, the valve body 430 can be adjustably positionable to block the fluid flow path 482. For example, the valve body 430 may be adjusted to bring the end wall 462 into contact with the end wall 414, in which case the flowable area 480 will be essentially zero.

In some embodiments, the valve body 430 can be held in a selected position within the cavity 412 by frictional contact of the valve body 430 with the interior surface 410. For example, contact between the valve portion 450 and the interior surface 410 can provide enough friction to prevent the valve body 330 from moving (e.g., due to fluid pressure or movement, vibration, acceleration forces) other than when the fluid flow trim assembly 400 is being calibrated.

In some embodiments, the valve body 430 can be held in a selected position within the cavity 412 by a collection of threads formed on an outer surface of the valve body 430 in mating contact a collection of threads formed on the interior surface 410. For example, in interior surface 410 may include threads formed in the valve outer housing 402, and the outer periphery of the valve portion 450 may include threads that can correspondingly mate with the threads on the interior surface 410. In such an example, the valve body 430 may be moved to adjust the flowable area 480 by threading and unthreading the valve body 430 within and relative to the outer housing 402 to adjust the flowable area 480.

Figure 5:
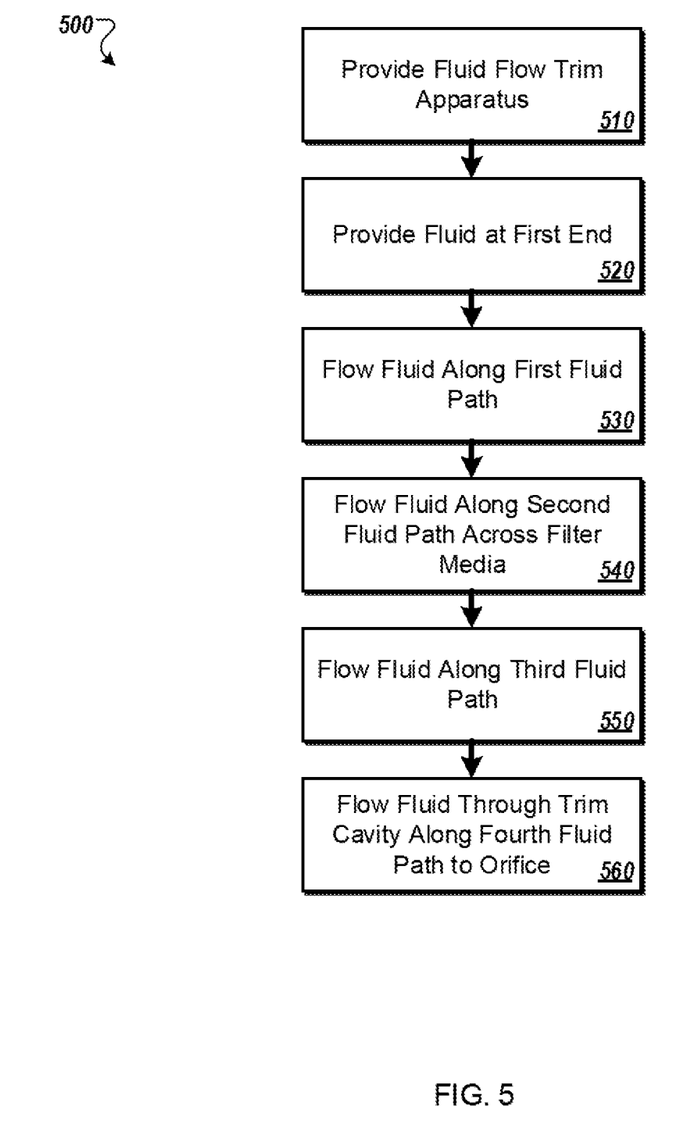
FIG. 5 is a flow diagram of an example of a process for using a variable trim orifice with filter.

FIG. 5 is a flow diagram of an example of a process 500 for using a variable fluid flow trim orifice with filter, such as the example of a fluid flow trim apparatus 300 or 400 of FIGS. 3 and 4.

At step 510 a fluid flow trim apparatus is provided. The fluid flow trim apparatus includes an elongate body extending from a first end to a second end opposite the first end and defining a cavity having an interior surface with a first cross-sectional area and an end wall at the second end, and a valve body disposed at least partly within the cavity and having a first valve portion having a second cross-sectional area less than the first cross-sectional area, a second valve portion having a third cross-sectional area less than the second cross-sectional area, and a third valve portion in sealing contact with the interior wall. For example, the fluid flow trim apparatus 300 can be provided.

At 520, a fluid is provided at the first end. For example, fluid such as fuel can be provided at the first end 304.

At 530, the fluid is flowed along a first fluid path through a first cavity portion defined by the interior wall and the first valve portion and extending from the first end partly into the elongate body. For example, the fluid can flow along the fluid flow path 346.

At 540, the fluid is flowed along a second fluid path across a filter media in a second cavity portion defined by the interior wall and the second valve portion and extending from the first valve portion to the third valve portion. For example, the fluid can flow along the fluid flow path 378 across the filter media 374.

At 550, the fluid is flowed along a third fluid flow path in a channel in a third valve portion to a trim cavity defined by the third valve portion, the interior surface, and the end wall. For example, the fluid can be flowed through the channels 352 along the fluid flow paths 354 to the trim cavity 360.

At 560, the fluid is flowed through the trim cavity along a fourth fluid path to an orifice in the end wall, the orifice having a fourth cross-sectional area less than the first cross-sectional area. For example, the fluid can flow along the fluid flow path 382 to the orifice.

In some implementations, process 500 can also include adjustably positioning, while the fluid is not flowing, the valve member to a selected position within the cavity to modify a flowable area of the fourth fluid flow path, the valve body maintaining the selected position while the fluid is flowing through the fluid flow trim apparatus. For example, the valve body 330 can be adjusted to calibrate one or more characteristics of fluid flow before the valve body 330 is installed in the turbine engine 10 of FIG. 1. Once installed, the valve body 330 maintains its position relative to the outer housing 302.

In some implementations, the valve body can be adjustably positionable such that the flowable area of the fourth fluid flow path is equal to or less than a flowable area of the orifice. In some implementations, the valve body can be adjustably positionable to block the fourth fluid flow path. For example, the valve body 330 can be moved within the cavity 312 to alter or close the flowable area 380 of the trim cavity 360.

In some implementations, the valve body can be held in the selected position relative to the outer housing by frictional contact of the valve body with the interior surface, e.g., contact between the valve portion 350 and the interior surface 310. In some implementations, adjustably positioning the valve member to a selected position can include threadedly mating a collection of threads formed on an outer surface of the valve body with a collection of mating threads formed on the interior surface. For example the valve portion 350 can include machine threads and the interior surface can have mating threads that engage with the valve portion 350.

In some implementations, filter media can provide a flowable area substantially greater than a flowable area of the channel. For example, the flowable area 384 is greater than the cross sectional area 386 of the channel 352.

In some implementations, the second fluid flow path can be substantially not parallel to the first fluid flow path. For example, the fluid flow path 378 is not parallel to the fluid flow path 346.

Notably, the concepts herein have been discussed in connection with a combustor and sub-assemblies for a gas turbine engine. However, they are not so limited. For example, the same concepts could be applied to other forms of engines, as well as other apparatus using combustors and/or combustion chambers.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

What is claimed is:

1. A fluid flow trim apparatus comprising:
   an outer housing having an elongate body extending from a first end to a second end opposite the first end and defining a cavity comprising an interior surface and a first end wall at the second end, the first end wall having an orifice therethrough;
   a valve body having an elongate body, wherein the valve body is adjustably positionable, the valve body comprising:
     a first valve portion disposed at least partly within the cavity and in contact with the interior surface;
     a second valve portion disposed at least partly within the cavity and having a second end wall, wherein the first valve portion and the second valve portion have a first channel formed therethrough defining a first fluid flow path, the second valve portion and the interior surface define a second fluid flow path, and the second valve portion has a second channel formed therethrough proximal the second end wall and defines a third fluid flow path fluidically connecting the first fluid flow path to the second fluid flow path; and
     a trim cavity defined by the first end wall, the second end wall, and the interior surface, and fluidically connected to the second fluid flow path; and
   a filter media extending along a portion of the first channel to proximal the second end wall and dividing the third fluid flow path.

2. The fluid flow trim apparatus of claim 1, wherein the valve body is adjustably positionable within the cavity to a selected position to modify a flowable area of the trim cavity when a fluid is not flowing through the fluid flow trim apparatus, and the valve body is not adjustably positionable within the cavity when the fluid is flowing through the fluid flow trim apparatus.

3. The fluid flow trim apparatus of claim 2, wherein the valve body is adjustably positionable such that the trim cavity has a flowable area equal to or less than a flowable area of the orifice.

4. The fluid flow trim apparatus of claim 2, wherein the valve body is adjustably positionable to block fluid flow to the orifice.

5. The fluid flow trim apparatus of claim 2, wherein the valve body is held in the selected position by frictional contact of the valve body with the interior surface.

6. The fluid flow trim apparatus of claim 2, wherein the valve body is held in the selected position by a collection of threads formed on an outer surface of the valve body in mating contact a collection of threads formed on the interior surface.

7. The fluid flow trim apparatus of claim 1, wherein the filter media provides a flowable area greater than a flowable area of the third fluid flow path.

8. The fluid flow trim apparatus of claim 1, wherein the third fluid flow path is not parallel to the first fluid flow path.

9. The fluid flow trim apparatus of claim 1, wherein the cavity further comprises a first interior surface portion extending from the first end and partly into the cavity, and a second interior surface portion extending from the first interior surface portion to the second end, wherein the first valve portion is in contact with the first interior surface portion.

10. A method of trimming a fluid flow, comprising:
    providing a fluid flow trim apparatus having an elongate body extending from a first end to a second end opposite the first end and having an interior wall defining a cavity comprising an interior surface and a first end wall at the second end, the first end wall having an orifice therethrough, and a valve body disposed at least partly within the cavity, wherein the valve body is adjustably positionable, the valve body comprising a first valve portion disposed at least partly within the cavity and in contact with the interior surface, a second valve portion disposed at least partly within the cavity and having a second end wall, wherein the first valve portion and the second valve portion have a first channel formed therethrough defining a first fluid flow path, the second valve portion and the interior surface define a second fluid flow path, and the second valve portion has a second channel formed therethrough proximal the second end wall and defines a third fluid flow path fluidically connecting the first fluid flow path to the second fluid flow path, and a trim cavity defined by the first end wall, the second end wall, and the interior surface, and fluidically connected to the second fluid flow path;
    providing a fluid at the first end;
    flowing the fluid along the first fluid flow path;
    flowing the fluid along the third fluid path across a filter media extending along a portion of the first channel to proximal the second end wall and dividing the third fluid flow path;
    flowing the fluid along the second fluid flow path; and
    flowing the fluid through the trim cavity along a fourth fluid path to the orifice.

11. The method of claim 10 further comprising adjustably positioning, while the fluid is not flowing, the valve body to a selected position within the cavity to modify a flowable area of the trim cavity, the valve body maintaining the selected position while the fluid is flowing through the fluid flow trim apparatus.

12. The method of claim 11, wherein the valve body is adjustably positionable such that the flowable area of the trim cavity is equal to or less than a flowable area of the orifice.

13. The method of claim 11, wherein the valve body is adjustably positionable to block the fourth fluid flow to the orifice.

14. The method of claim 11, wherein the valve body is held in the selected position by frictional contact of the valve body with the interior surface.

15. The method of claim 11, wherein adjustably positioning the valve body to a selected position further comprises threadedly mating a collection of threads formed on an outer surface of the valve body with a collection of threads formed on the interior surface.

16. The method of claim 10, wherein the filter media provides a flowable area greater than a flowable area of the third fluid flow path.

17. The method of claim 10, wherein the third fluid flow path is not parallel to the first fluid flow path.

18. The method of claim 10, wherein the cavity further comprises a first interior surface portion extending from the first end and partly into the cavity, and a second interior surface portion extending from the first interior surface portion to the second end, wherein the first valve portion is in contact with the first interior surface portion.

19. An internal combustion engine comprising:
- an engine housing having a combustion chamber formed therein;
- a fuel supply line; and
- a fluid flow trim apparatus fluidically connecting the fuel supply line to the combustion chamber, the fluid flow trim apparatus comprising:
    - an outer housing having an elongate body extending from a first end to a second end opposite the first end and defining a cavity comprising an interior surface and a first end wall at the second end, the first end wall having an orifice therethrough;
    - a valve body having an elongate body wherein the valve body is adjustably positionable, the valve body comprising:
        - a first valve portion disposed at least partly within the cavity and in contact with the interior surface;
        - a second valve portion disposed at least partly within the cavity and having a second end wall, wherein the first valve portion and the second valve portion have a first channel formed therethrough defining a first fluid path, the second valve portion and the interior surface define a second fluid flow path, and the second valve portion has a second channel formed therethrough proximal the second end wall and defines a third fluid flow path fluidically connecting the first fluid flow path to the second fluid flow path; and
    - a trim cavity defined by the first end wall, the second end wall, and the interior surface, and fluidically connected to the second fluid flow path; and
- a filter media extending along a portion of the first channel to proximal the second end wall and dividing the third fluid flow path fluidically connecting the first fluid flow path to the second fluid flow path.

* * * * *

UNITED STATES PATENT AND TRADEMARK OFFICE
CERTIFICATE OF CORRECTION

PATENT NO. : 10,598,139 B2
APPLICATION NO. : 15/850972
DATED : March 24, 2020
INVENTOR(S) : Deke Pyle, Sander Niemeyer and Jason VanDort Page 1 of 1

It is certified that error appears in the above-identified patent and that said Letters Patent is hereby corrected as shown below:

In the Claims

Column 12, Line 40, Claim 10, after "third fluid" insert -- flow --;

Column 12, Line 58, Claim 13, after "the" delete "fourth";

Column 14, Line 1, Claim 19, delete "body wherein" and insert -- body, wherein --.

Signed and Sealed this
Twenty-first Day of July, 2020

Andrei Iancu
*Director of the United States Patent and Trademark Office*